Dec. 27, 1938. J. L. YONKERS 2,141,964

RECORDING PROCESS AND SYSTEM

Filed Aug. 7, 1937

Inventor:
John L. Yonkers.
By- Robert L Kahn Atty.

Patented Dec. 27, 1938

2,141,964

UNITED STATES PATENT OFFICE 2,141,964

RECORDING PROCESS AND SYSTEM

John L. Yonkers, Evanston, Ill.

Application August 7, 1937, Serial No. 157,994

6 Claims. (Cl. 234—70)

This invention relates to a recording process wherein during the making of the record it is possible to monitor the record. The recording process itself is limited to the formation of a record by a mechanical stylus on a record medium having uniform optical properties. During the monitoring, it is possible to combine the monitoring action and the formation of a second permanent photographic record.

The customary apparatus for making a record of heart beats involves the formation of a photographic record. This is not available for study during the recording process and must be developed like any other film. Such a necessity imposes a delay element together with a possibility of failure which makes the entire record more expensive and time consuming. In the case of a sick person, an immediate record for study by an expert is a necessity.

Another field for making records of the above type is in geological exploration. Thus, in prospecting for oil pools, it is customary to make a determination of the earth faults for considerable distances. This is usually done by setting off a blast at a predetermined point and recording the resulting earth tremors at various points. From the displacement at various points together with a treatment of the transmission properties of the earth to sound impulses of various frequencies by direct conduction, by reflection, and by refraction, it is possible to determine the location of large pools of oil. Inasmuch as careful records for this are necessary, it has been customary to use swinging mirrors and photographic film. The apparatus is both costly and delicate and then only gives a record upon development of the film.

Other fields where curves are to be studied are in connection with electric devices where resonance is a factor to be determined.

An object of this invention is to devise a recording system whereby during or after the formation of a permanent record in the form of a groove or scratch, the recording curve as formed on the record may be visually inspected and may, if desired, be re-recorded by light responsive means to form another and independent record.

In general, curves having frequency components as high as 15,000 cycles per second may be treated by the method herein disclosed. Higher frequencies may be handled with specially designed apparatus. Mechanical resonance may be compensated by electrical resonance or pre-distortion or any of the methods used in phonograph recording for the making of a faithful record.

In general, the method contemplates the actuation of a cutting stylus by any suitable means for recording purposes. This stylus engages a homogeneous and preferably transparent medium having a smooth surface. The resulting scratch of the stylus upon the surface which is preferably moving, changes the optical properties of the medium. Thus, if the medium is transparent, as clear celluloid, it is possible by a form of dark field illumination to project an image of the scratch on a screen or film. If the medium is opaque, its reflecting properties are altered by the scratch and dark field illumination may be used to project the scratch. In either case the scratch made for recording purposes may be projected for visual inspection either at the point where the stylus is operating or any other subsequent point on the scratched film during or after recording. Photographic copies may be made during this time or later.

As is well known in microscopy, dark field illumination contemplates the projection upon the object to be studied of light beams at angles greater than that subtended by the objective lens at the object point. Hence, such light goes through the object as a focal point and then diverges beyond the objective lens. If any light aberrations occur such as due to refraction or reflection, then the diverging light beams are bent at such abnormal points into the lens and the abnormal point appears lighted.

Thus, in the case at hand, a conical beam of light is focussed upon the film. A small cone of light is cut out of the center to cause the projection of the light beam to pass just outside of the objective lens. Any scratch on the film causes the light to bend at that point inside of the dark region and the scratch appears as a glow. Obviously, the same results may be secured by a reflected beam instead of a transmitted beam. In such a case, the scratch would tend to change the critical reflection angle of a light beam and cause enough diffusion to bring some light into the field of vision on the screen.

Referring to the drawing.

Figures 2, 3:
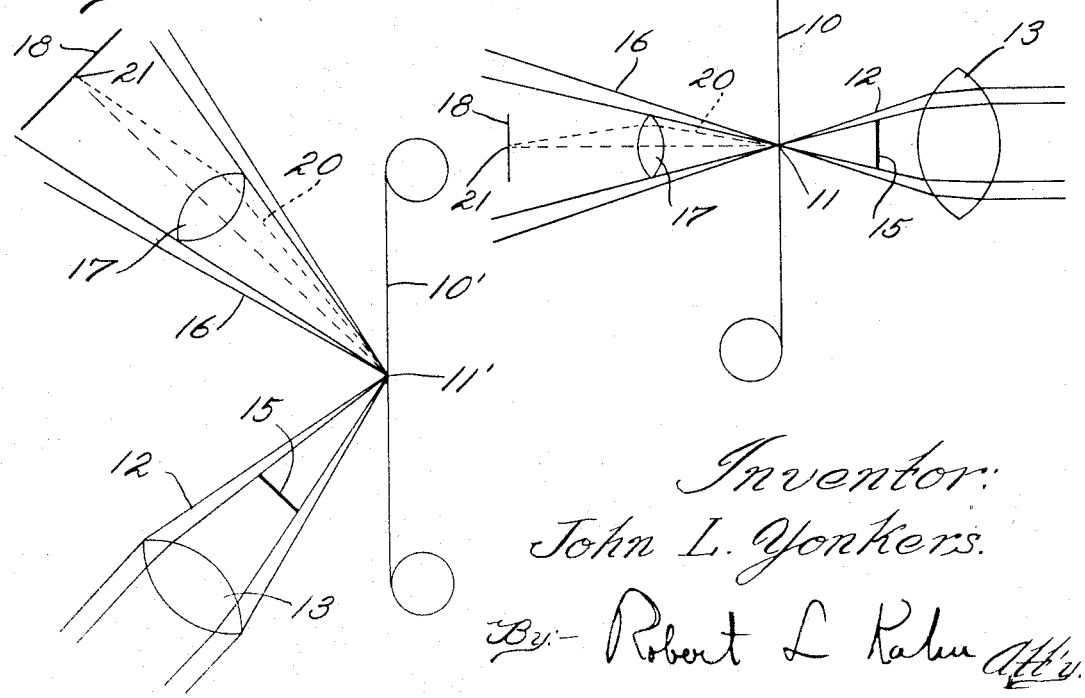
Figure 2 is a diagram of the optical portion of the system showing dark field illumination on a transparent object.
Figure 3 is a modification of Figure 2 showing the system for a reflecting object.

Referring first to Figure 2, a transparent film 10 has a portion 11 thereof as the focal point of a beam of light 12 coming from a lens 13. A conical beam 12 has a central portion thereof cut out by an opaque disc 15 which may be located anywhere between focal point 11 and the nodal point of the lens 13 and in practice may be disposed right on the lens surface. As shown by the full lines, a thin tapering annulus of light is focused above spot 11, and under ordinary conditions, passes through and forms the diverging beam 16. Within the dark portion of beam 16, a lens 17 is disposed having one focus at portion 11 and the other focus on a screen 18. The angles subtended at focus 11 by dark disc 15 and lens 17 should be equal and, under those conditions, screen 18 is dark. However, upon the existence of any optical abnormality at point 11, such as might be occasioned by a scratch in the film, it is clear that linear transmission of light will no longer take place. Instead, a certain amount of refraction will occur, with the result that some light, indicated by dotted lines 20, will be bent inside to impinge on lens 17. This lens will focus such refracted light upon point 21 and thus a light spot will show up.

Referring to Figure 3, the same optical system is shown, except that spot 11' on film 10' is adapted to reflect the light beam.

Figure 1:
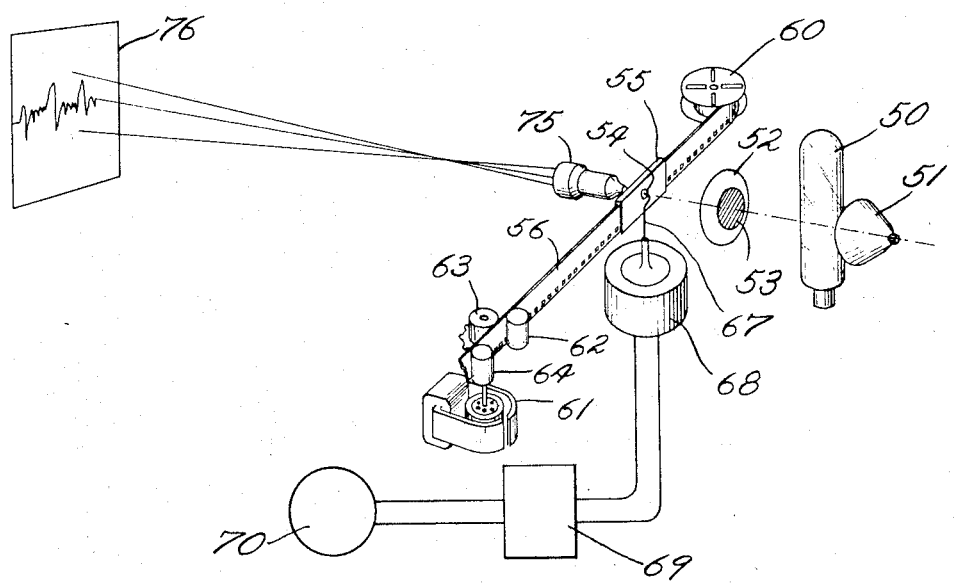
Figure 1 is a diagrammatic representation of the entire recording system.

Now referring to Figure 1, a lamp 50 with a suitable reflector 51 supplies light to lens 52 having a dark disc 53 in the center thereof. Lens 52 focuses the light upon window 54 of a gate 55 through which transparent celluloid film 56 passes. This film may be run from a storage reel 60 and guided by rollers 62 and sprocket 63. Motor 61, which may be of the alternating current synchronous type, drives the film through the pulley 64 and this film may be stored upon any suitable reel not shown. Operating in window 54 is a stylus 67 vibrated in any suitable manner and here shown as actuated by electromagnetic means fed by electric currents corresponding to the curves or sounds to be recorded. Inasmuch as such systems are old, it is only necessary to indicate that device 68 is fed by a suitable amplifier 69 which in turn is fed by any suitable pick up device 70 adapted to translate mechanical impulses to electric currents.

Stylus 67 cuts a fine scratch upon film 56 which scratch may be of the order used in recording wax records, but need not be so deep. In fact, the scratch need only be deep enough to mar the surface of the film.

Beyond gate 54 is a second optical system 75 adapted to concentrate the refracted light upon a screen 76.

What is claimed is:

1. In a recording system, a stylus, means for vibrating said stylus, a solid record material having uniform optical properties over its surface and throughout its thickness, and adapted to have a recording groove cut in its surface by said stylus, a lens for projecting a primary beam of light to a focus on a portion of the record groove, means for removing from said projected light beam a central portion of said beam to form a centrally disposed unlit region tapering to the focal point, said last named means being disposed between the focal point and nodal point of the lens and symmetrically with respect to the lens axis, a second lens disposed in the normal path of the secondary light beam resulting from the operation of said record material on said primary beam with the axis of the second lens coincident with the axis of said secondary light beam, a screen beyond said second lens and substantially at the focus thereof, said second lens subtending substantially the same solid angle subtended by the centrally disposed substantially dark portion of the primary beam, whereby in the absence of a record groove on said record material said second lens is normally in a region of darkness and upon the presence of a record groove in the focal point of said primary light beam said beam is operated upon by said record material in an abnormal fashion to divert some of the secondary beams into the field occupied by said second lens to be trained upon the screen.

2. The system of claim 1 wherein the primary beam is transmitted through said record material.

3. The system of claim 1 wherein said primary beam is adapted to be reflected from the surface of said record.

4. A reproducing system comprising a record of solid material having uniform light transmitting properties throughout the active surface thereof and upon which a record groove has been cut, a lens for projecting a primary beam of light with the focus of said beam at a record portion of said material, means for removing a central portion of the beam of light to form a symmetrically disposed unlit region terminating at the focus, a lens disposed in the normal path of the secondary light beam resulting from the operation of said record material on said primary beam, said lens axis being coincident with said secondary beam axis, said second lens being adapted to subtend the normally dark portion of the secondary beam, whereby upon the presence of a groove at the focal point of said light beam said second lens will receive refracted light and focus such refracted light on said screen for visual observation.

5. A reproducing system of the character described comprising a first lens having a focal point and adapted to focus light in a beam at said focal point, an opaque disk disposed symmetrically with respect to said lens axis between said focal point and the nodal region of said lens, a record material at the focal point of said lens and adapted to be illuminated by said focussed light beam, said record material being a solid substance having uniform optical properties and having a recording groove cut on the surface thereof, said record material operating upon said light beam to produce a secondary diverging beam with a centrally diverging unlit region due to said disk in the primary beam, a second lens disposed in the path of said secondary beam and normally being entirely in said unlit region, a screen at the focal point of said second lens whereby when a grooved portion of said record material is in the focus of said first lens the abnormal optical properties of said record material cause said second beam to be refracted in an abnormal manner to divert some of the light in said secondary beam within the normally dark region in the field of said second lens to be focussed upon said screen.

6. The system of claim 5 wherein said record material is normally smooth and has uniform reflecting properties in the absence of any record groove.

JOHN L. YONKERS.